(12) United States Patent
Tullis

(10) Patent No.: US 6,703,633 B2
(45) Date of Patent: Mar. 9, 2004

(54) METHOD AND APPARATUS FOR AUTHENTICATING A SIGNATURE

(75) Inventor: Barclay J. Tullis, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/931,842

(22) Filed: Aug. 16, 2001

(65) Prior Publication Data

US 2003/0034463 A1 Feb. 20, 2003

(51) Int. Cl.[7] .................................................. G06K 9/46
(52) U.S. Cl. ........................ 250/556; 382/122; 382/189
(58) Field of Search ............................. 355/71; 382/115, 382/116, 119, 122, 123, 170, 172, 186–189; 250/556, 208.1

(56) References Cited

U.S. PATENT DOCUMENTS

| | | | |
|---|---|---|---|
| 4,128,829 A | | 12/1978 | Herbst et al. |
| 4,963,859 A | * | 10/1990 | Parks ........................ 345/176 |
| 4,985,928 A | * | 1/1991 | Campbell et al. ........... 382/119 |
| 5,227,642 A | | 7/1993 | Shimizu |
| 5,251,265 A | * | 10/1993 | Dohle et al. ................ 382/123 |
| 5,257,320 A | * | 10/1993 | Etherington et al. ........ 382/119 |
| 5,578,813 A | | 11/1996 | Allen et al. |
| 5,657,396 A | * | 8/1997 | Rudolph et al. ............ 382/190 |
| 5,686,720 A | | 11/1997 | Tullis |
| 5,802,204 A | * | 9/1998 | Basehore ..................... 382/186 |
| 5,892,824 A | * | 4/1999 | Beatson et al. ............. 713/186 |
| 6,222,938 B1 | * | 4/2001 | Melen ......................... 382/154 |
| 6,246,067 B1 | | 6/2001 | Tullis |
| 6,373,965 B1 | * | 4/2002 | Liang ......................... 382/112 |

* cited by examiner

Primary Examiner—Stephone B. Allen

(57) ABSTRACT

A device and method are disclosed for capturing an electronic image signal from the interaction of light with features of, on, or near a media surface. In addition to signature marks, these features can include characters, character strings, symbols, icons, dot pitches, line types, line and character formats, optical densities, color, indentations, texture, and patterns. More specifically, the claimed invention is useful primarily for optically capturing, processing, parameterizing, and identifying hand written signatures, but may also be applied to identification of other surface features such as print, line art, graphics embossments, textures or colors. The signals are captured, processed, sometimes parameterized, and used to make associations with an identifying name. These associations can be given a statistical probability of correctness.

31 Claims, 9 Drawing Sheets

METHOD AND APPARATUS FOR AUTHENTICATING A SIGNATURE

TECHNICAL FIELD

The present claimed invention relates to the field of optically scanning a surface of a document or work of art. More specifically, the present claimed invention relates to the use of a freehand optical scanner of images from documents or other printed or written media for the purpose of inspecting and authenticating documents or works of art.

BACKGROUND OF THE INVENTION

Digital imaging has come of age. Equipment that was once regarded as cutting edge technology is now commonplace on the desktop. The powerful computers required to manipulate digital images are now considered entry level, so it is not surprising to learn that optical scanners, the devices used to get optical images into a computer as digital images, form the basis of one of the fastest growing markets today. Hereafter, the terms "optical scanning" and "optical scanner" will be referred to more simply as "scanning" and "scanner" respectively.

On the simplest level, a scanner is a device that converts light into 0s and 1s (a computer-readable format). More simply, scanners convert analog data into digital data. All scanners work on the principle of sensing light reflected, transmitted, or emitted from a surface. Scanners usually contain a light source and an image sensor. If scanning speed is not required, ambient illumination can sometimes be used instead of having a built-in light source.

To direct light from the source to the sensor that reads light values, scanners may use prisms, lenses, and other optical components. The amount of light reflected, transmitted, or emitted by the object being scanned is picked up by the sensor and converted to voltages by a photo sensor array.

Photo sensor array technology is responsible for having made scanning a desktop application and has been in use for a number of years in devices such as fax machines and digital cameras. A photo sensor array is a solid state electronic device that converts light into electric signals. A desktop scanner sensor typically has thousands of photosensitive elements arranged in a long thin line. Each photosensitive element acts as a photometer, converting measured light into an electric signal, which can then be sampled and changed to discrete digital values by an analog-to-digital converter (ADC).

An advancement in scanner technology is optical character recognition (OCR). OCR is a method for recognition of typeset, typed, and, in some cases, hand-printed letters, numbers, and symbols using optical sensing technology as mentioned above. The light reflected by a typed document, for example, is recorded as patterns of light and dark areas by a scanner. A computer program analyzes the patterns and identifies the characters they represent, with some tolerance for less than perfect and uniform text. OCR is also used to produce text files from computer files that contain images of alphanumeric characters, such as those produced by fax transmissions.

Unfortunately, while OCR offers many benefits, it also has some limitations. OCR has difficulties when deciphering hand written characters. Handwriting is hard to deal with because some handwriting is so fancy or messy that it hardly constitutes writing. Even more so, OCR has very limited capabilities for recognizing signatures.

In one prior art system (U.S. Pat. No. 5,227,642), dark-field optics are used for optically reading surface textures. This invention is mostly used for reading embossments and is not useful with papa media because the paper scatters most of the incident light. In addition, (U.S. Pat. No. 5,432,868) claims a scanning device for the recognition of signatures. In this invention, a classical scanning device is used to sense the time intervals between detected stroke lines. The stroke information is processed using frizzy logic.

In other prior art systems, (U.S. Pat. No. 4,128,829) "Signature Verification Method and Apparatus Utilizing Both Acceleration and Pressure Characteristics" and (U.S. Pat. No. 3,983,535) "Signature Verification Method and Apparatus" Image correlation is applied to the ink, but microscopic detail of the media surface is not considered.

Furthermore, (U.S. Pat. No. 5,578,813) "Freehand Image Scanning Device Which Compensates for Non-linear Movement" describes a scanner with navigation cameras that see the microscopic detail of a media surface. Additionally, (U.S. Pat. No. 5,686,720) "Method and Device for Achieving High Contrast Surface Illumination" describes the use of grazing illumination for improving the contrast of images of microscopic detail of a media surface.

Identification through one's signature occurs during many everyday transactions. Any process or transaction that requires an individual's signature, is a prime contender for signature identification. The major technological hurdle for signature identification involves the method of trying to differentiate between the parts of the signature that are habitual and those that vary with each signing.

Even more difficult is authenticating original documents or items that have signatures on them. With the advancements in optical scanning and printing, the importance of distinguishing between forgeries and originals has heightened. The quality of reproductions has risen to a level where it is nearly impossible to distinguish or identify originals with the human eye. Even with the help of OCR technology, it remains nearly impossible to quickly identify a document as an original.

Thus there has arisen a need for a device that can quickly and reliably identify signatures and documents as originals. Additionally, such a device could be used to identify other surface features, such as artwork, and authenticate their originality.

SUMMARY OF THE INVENTION

Accordingly, the present invention provides a portable device capable of recognizing and identifying signatures and surface features of media. More specifically, in one embodiment, this invention pertains to the use of an image scanner for inspecting signatures or other handwriting on a material surface for the purpose of authenticating the signature or originality of a document or article.

More specifically, the present invention includes a scanning device for acquiring images from a surface containing signatures. The scanning device includes a memory for retaining template image characteristics of known signatures, a processor for comparing image characteristics of known signatures to those of the scanned image, logic used to determine if the characteristics of the scanned image are similar to the image characteristics of the known signature, and an output device for giving the user an output of the probability that the scanned signature closely matches the template image stored on the device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1A:
FIG. 1A shows an example of a signature as it might appear on a document.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

In general this invention is useful for capturing an electronic image signal from the interaction of light with features on or near a media surface. In addition to signature marks, these features can include characters, character strings, symbols, icons, dot pitches, line types, line and character formats, optical densities, color, texture, and patterns. More specifically, the claimed invention is useful primarily for optically capturing, processing, parameterizing, and identifying hand written signatures, but may also be applied to identification of other surface features such as print, line art, graphics, embossments, patterns, textures, and colors. A feature, such as texture for example, can mean an image contrast produced by the illumination of paper fibers and other material comprising a media surface. The signals are captured, processed, sometimes parameterized, and used to make associations with an identifying name. In the case of a hand written signature, the claimed invention would give a statistical probability of the signature being authentic.

These and other objects of the invention are provided by a novel free-hand scanner coupled together with a memory of signature templates and/or parametric data; search capabilities; detect and identify functions; and a means of notifying the user when and where matches are found as well as how good they are. These elements may be integral to one another within a common, hand held device or they may be distributed between a probe unit, processing station, and perhaps databases within a computer network. Furthermore, the above mentioned functions and features may be used in combination with devices such as a telephone, data display, communication link, fax machine or a digital camera.

It has been discovered that a signature will leave a unique mark that depends on the writing implement used, the media onto which the signature is applied, the support for the media, and the mechanics and dynamics of the signer's handwriting including but not limited to forces, pressures, angles, velocities, rotations and accelerations. Although many of these variables mean that repeated signatures will never be absolutely identical, nevertheless certain parameterizable features will remain similar enough for any one signer to be usefully differentiated from a finite set of other signers. And in the special case of a work of art or special document, wherein it is its uniqueness that is of interest rather than that of the signer, the given signature can be authenticated with much greater certainty.

With reference now to FIG. 1A examine the example of a signature 100 as it might appear on a document. Light interactive material deposited on the media along with deformations, created by the pressure exerted from the writing instrument, is left in the media when the signature is created.

Figure 1B:
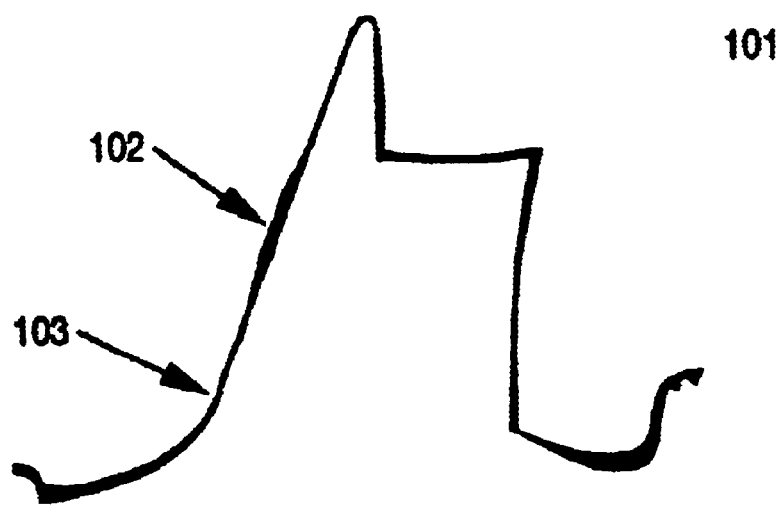
FIG. 1B is a typical line segment within a signature that may contain variations in line-width from relatively wide to relatively narrow as well as many other shape factors and spatial distributions of optical densities.

FIG. 1B shows a typical line segment 101 within a signature 100. This line segment 101 may contain variations in line-width from relatively wide 102 to relatively narrow 103. The fiber structure in the media and the dynamics of the writing style are responsible for non-uniform lines as well as many other shape factors and spatial distributions of optical density.

Figure 1C:
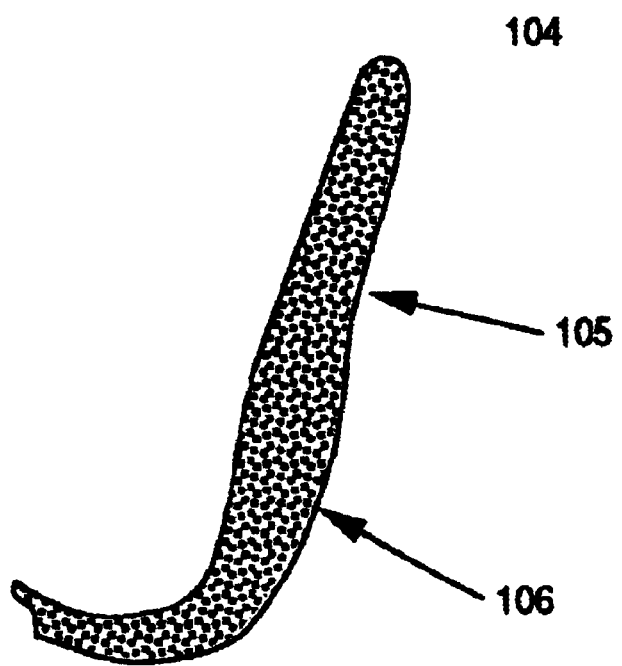
FIG. 1C is a line portion of the signature that contains variations of texture and coloration depicted by areas shaded light and dark.

FIG. 1C shows a line portion 104 of the signature 100 that contains variations of texture and coloration depicted by areas shaded dark 105 and light 106. This figure represents a magnified view of what an illuminated signature might look like to a scanner.

Figure 2:
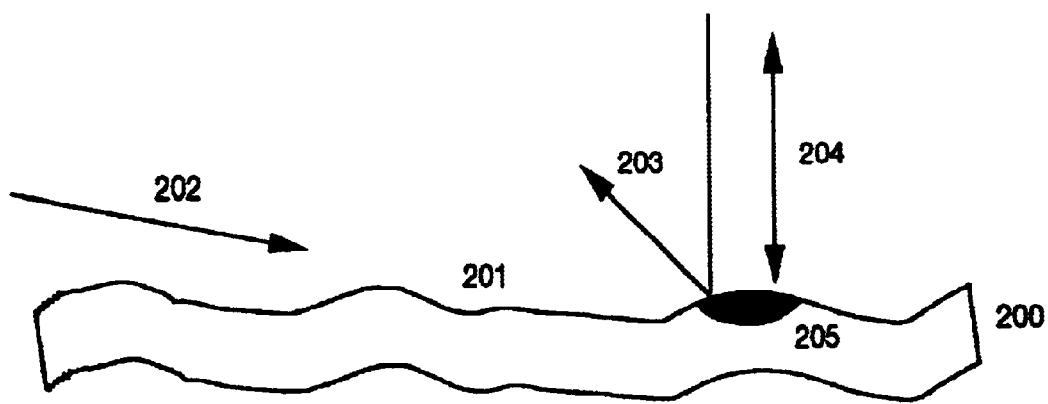
FIG. 2 shows a portion of a media sheet having a printed portion showing part of the mark of a signature.

FIG. 2 shows a typical media 200 having a printed surface 201 showing the mark of a signature 205 and the surface texture of the media 200. Illumination 202, 203, and 204 can be applied to the media 200 in various ways. For example, illumination 202 represents grazing illumination or other than normal illumination. Illumination 203 represents illumination that is scattered into directions other than specularly from the surface 201. The mark 205 that a signature leaves on a media surface may consist of, but not be limited to dyes, carbon deposits or other optically interactive matter. When light interacts with such matter, it is both scattered 203 and reflected 204.

Figure 3:
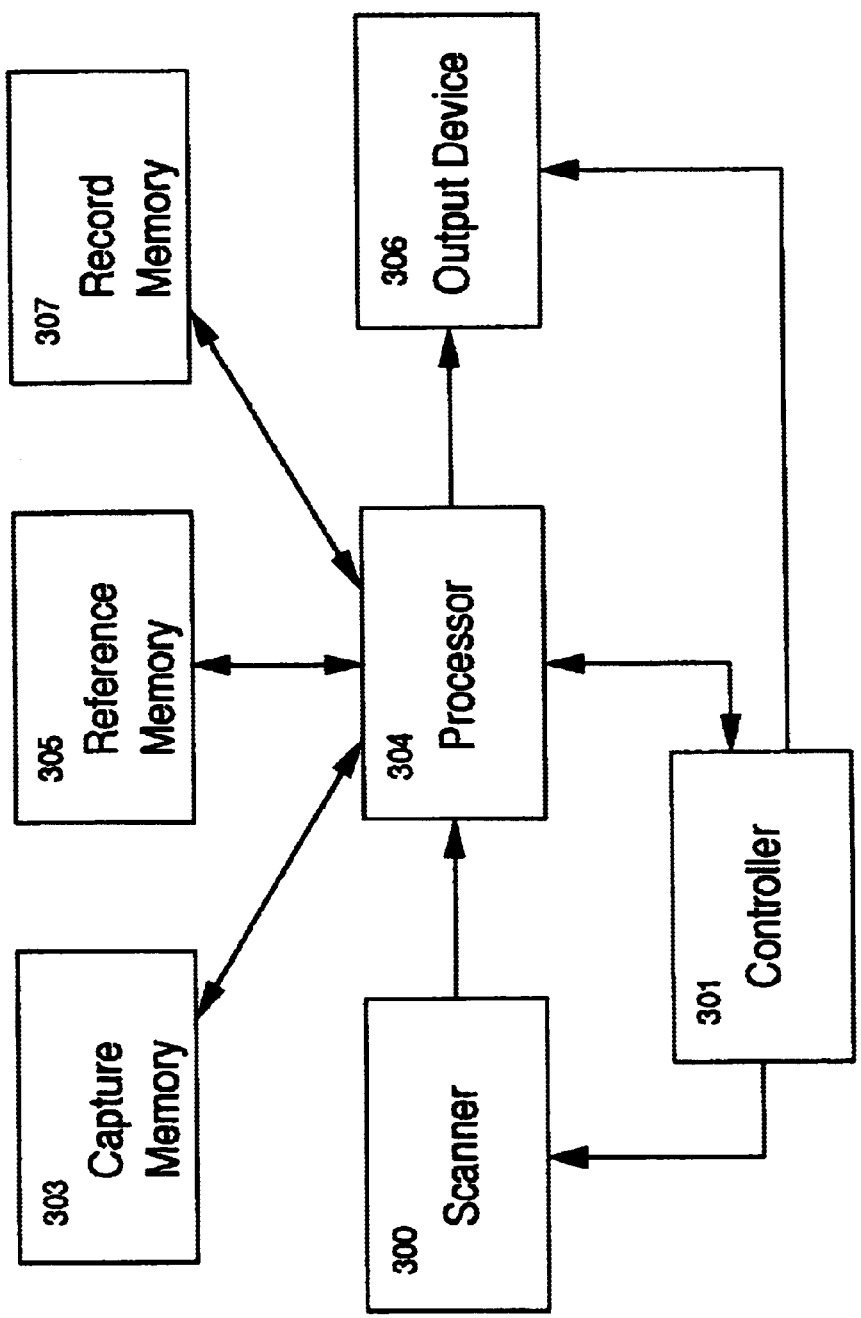
FIG. 3 is a structural relationship chart of the electronic functions in accordance with one embodiment of the present invention.

FIG. 3 shows a block diagram of an exemplary scanning device upon which the present invention may be practiced. This device comprises a scanner 300 coupled to a controller 301 which controls the illumination within the scanner 300. The data generated by the scanner 300 is stored in capture memory 303 and is processed by a processor 304. The processor 304 uses the data in capture memory 303 to generate information that can be compared against stored reference information in reference memory 305. This is used to authenticate signatures and determine originality of articles as described in detail below. Reference memory 305 could contain information such as a database of known signature information. Signature detection and identification accomplished by processor 304 is announced by an indicator or output device 306 and perhaps stored in record memory 307. Memories 303, 305, and or 307 may be memory devices that are separate from one another or in common with one another.

In one embodiment of the present invention, the scanner uses three different memories to store data. The scanner incorporates record memory 307, capture memory 303 and reference memory 305. Record memory 307 resembles a library of information. Record memory 307 stores the previously scanned images. When a new image is scanned, the image characteristics are archived in record memory 307. The archived image characteristics may include the image itself. The second memory element is capture memory 303. When a new image is scanned, the image is initially stored in the capture memory 303. Capture memory 303 stores the scanned image so the user can authenticate the image or until it is stored in record memory 307. When an image is to be authenticated, the user will use an image that has been previously stored in record memory 307. When the image is located, the image characteristics are copied from record memory 307 to reference memory 305. The comparison is made between the image characteristics of reference memory 305 and capture memory 303. The two images are compared and a quantitative probability of a match will be announced to the user.

There are multiple ways of entering information into the scanning device. In one embodiment, data of previously scanned images can be uploaded onto the device from a peripheral source such as a computer or personal digital assistant. In this embodiment, the image characteristics are uploaded directly to record memory 307. In another embodiment, authentic documents can be scanned and the image characteristics can be stored on the device. The scanned image is initially stored in capture memory 303, and from capture memory 303, the image can be stored in record memory 307.

In one embodiment of the present invention, the device comprises a freehand scanner used to recognize signatures. The scanner is small enough to be hand held and fit in the user's pocket. The portablility is important because it allows the user to have convenient means for accurately authenticating important documents. The ideal use of the present invention would be to verify signed documents that would require authentication. Such papers might include contracts, statements, letters, etc. With the present invention, it would be possible to accurately and quickly verify a signature and authenticate a document as an original, thus making the user less susceptible to forgeries, and copies. Not only can a signature on a signed document be authenticated as to the identity of the signer, but the scanned image can be kept as a unique record of that particular signing since the scanned image is a product of both the signature and the media containing the signature.

The device has a stored memory of existing signatures to compare against the signature being tested. The scanner is moved across a signature to be identified and records a detailed image. The image may be provided by illuminating the surface texture or other optical characteristics of the original. Photoelements generate output signals responsive to light energy received from the region of interest. The light intensity will vary on a pixel-by-pixel basis with variations in surface texture and print density. The image is then processed and parameterized. Typical parameters used to identify signatures may include but are not limited to the statistical frequencies of arcs of various relative radii of curvature, line segments of various length, line segments of various relative width, textures of various contrasts, optical densities and reflectiveness, and relative angles at line breaks. The typical parameters may also include but are not limited to contrasts at various spatial frequencies. Processing means then compare the generated set of fresh data to stored data sets prerecorded from a population of known signatures. Processing may include but is not limited to image correlation, scaling, rotating, and normalizing. Generic algorithms and fuzzy logic may be used as for adapted search improvement and for improving search results based on multiple or repeated measures. A signal could be then generated to the user to indicate the probability of a match having been found and may include measures of reliability or confidence for the match(es) given. A display screen could allow the user to see the numerical correlation between the inspected signature and the signatures stored in the record memory.

The photocells of the scanner have a resolution high enough to actually see the texture and grain of the media. The media surface is sensitive to pressure and usually contains permanent deformations after it has been written on. These deformations may be imaged as part of the signature by using grazing illumination. In addition, the ink or graphite deposited on the paper from the writing implement, tool or utensil does not completely cover the paper. Due to the high and low spots on the media's surface texture, the deposited material leaves a non-uniform line. When illuminated, the surface appears as light and dark spots. This is a result of the combination of unevenly deposited material and the surface contours of the media surface. This pattern is unique not only to the media and the writing instrument used, but to the exact location scanned and the direction of illumination provided. If one were to examine a printed document, each letter on the document would have different characteristics due to the media surface and the way the ink interacts with the media. It is nearly impossible for two signature marks to have the same attributes even on the same media surface written with the same writing instrument.

In another embodiment of the present invention, the hand-held scanner mentioned above would be used to identify documents or works of art by scanning surface characteristics of the piece in question. Using the same principals used to identify a signature, the surface characteristics would be illuminated and scanned as previously mentioned. Light used to illuminate the piece of work would be uniquely reflected by the media characteristics and that of the deposited material. Then the surface detail and characteristics would be compared to a previously stored sample of the scanned region. A correlation algorithm or fuzzy logic can give a mathematical probability of the authenticity of the piece in question. In this embodiment, the scanner uses the same principals mentioned above but uses characteristics other than but possibly including a written signature as references. In this embodiment, the scanner would use the unique media characteristics along with other features such as paint, charcoal, or any other distinct deposits or deformations on the artwork media to differentiate between an original and a forgery.

In a third embodiment of the present invention, the scanner is integrated into a writing instrument. It looks just like an ordinary pen or pencil, but has the capability to scan surfaces and signatures when used. The digital pen works on the same principals mentioned above. The pen has the capability to scan and record into memory the surface features and what the user is writing. This device could be used as a digital note taker by recording hand written messages or drawings and having the capability to convert them to a digital format. This is beneficial because any hand written document could be easily converted to a word processing file. Additionally, the device could be used as a personal identifier. By recording aspects of a signature such as pen angle, pressure, acceleration and line arc, one can distinctly identify the user.

Figure 4:
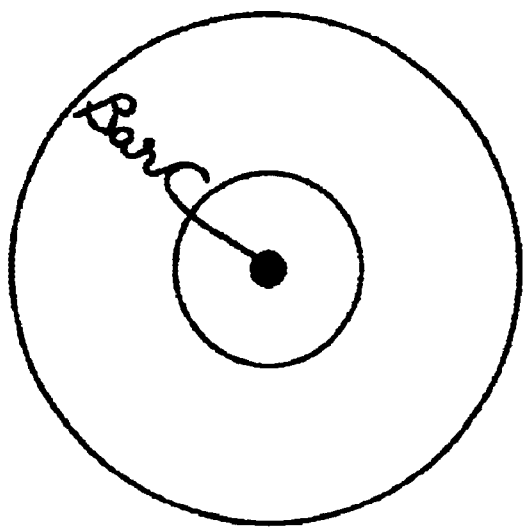
FIG. 4 shows a signature as it may appear when written with a scanning and writing apparatus.
Figure 5:
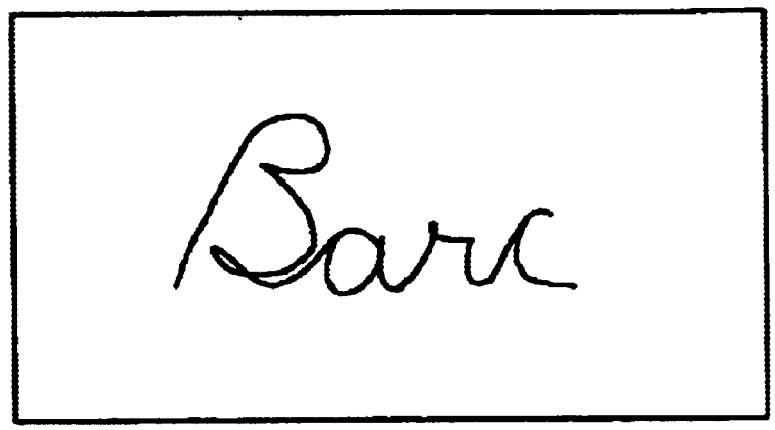
FIG. 5 is a captured signature as it may appear on a document.
Figure 6:
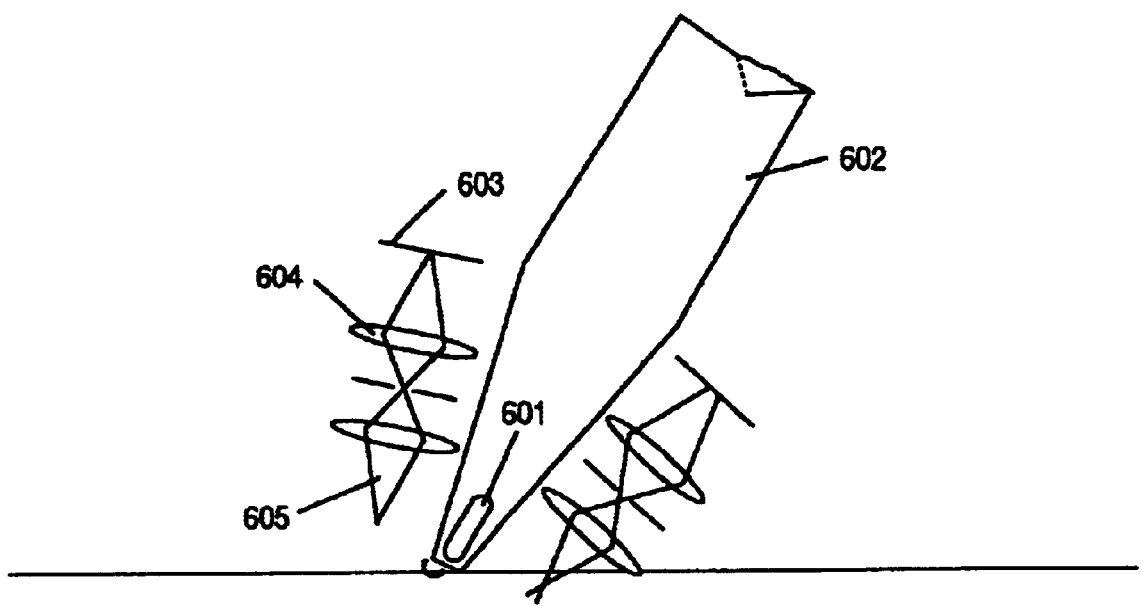
FIG. 6 is a representation of a scanning and/or writing apparatus showing relative angles to the media surface.

FIG. 6 shows an improvement to the above scanners or digital pen 602. It shows two separate imaging devices 603 each consisting of a telecentric lens 604 and photosensor array 605. Natural lighting could be used, but a preferred embodiment would use LED illumination 601 (light-emitting-diode illumination). A single telecentric lens and photosensor array "camera" could be used, but in the case of a pen, the writing element presents an opaque obstacle tat would block some of the field-of-view about the writing point. With at least two imaging devices ("cameras"), the image processing electronics could composite a single field-of-view to produce an image such as represented in FIG. 4. The property of a telecentric lens is that it provides for constant magnification, thus allowing some tilting of the pen without magnification distortion. U.S. Pat. No. 6,246,067 "System For Measuring The Tilt Of An Object", incorporated by reference herein, shows a method of sensing tilt by responding sensitively to changes in image contrast. More classically, sonic mechanical or elctro-optical mechanisms can be used to track best focus and use this tracking signal as the measure of object-to-lens distance, and thus tilt of the pen. U.S. Pat. No. 6,249,591 "Method and Apparatus For Control Of Robotic Grip Or For Activating Contrast-based Navigation," incorporated by reference herein, provides a technique whereby sensed changes in image contrast can be used to activate the acquisition or images when the pen or scanner is brought near to a writing surface. Once the data is recorded, it can be uploaded and stored in the band held signature scanner that was described above. Furthermore, an electronic pen portion could be coupled as a writing device for the hand held signature scanner.

Figure 7:
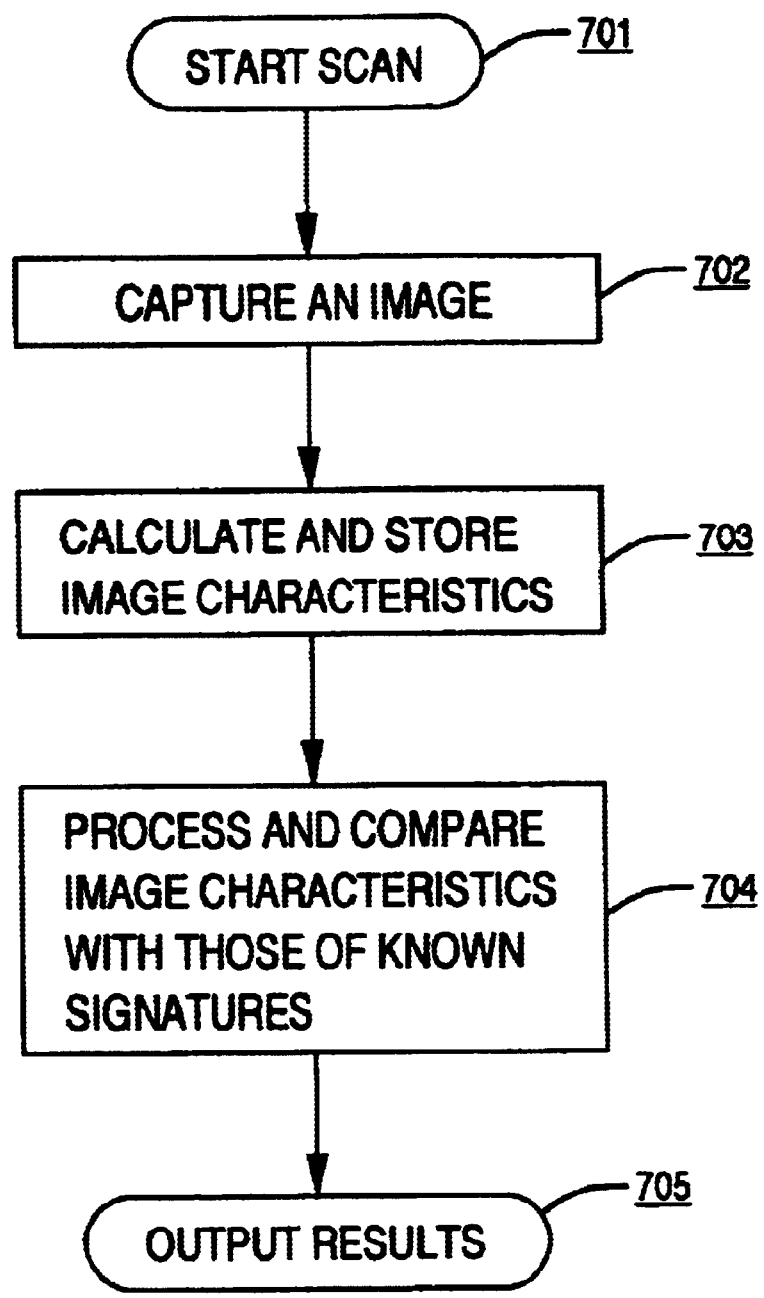
FIG. 7 is a flow chart of steps performed in accordance with one embodiment of the present invention.

FIG. 7 shows a flow chart 700 of the scanning process as described above. The start of a scan 701 initiates with the capture of an image 702. The captured image may consist of a single image or a sequence of images. Next, the device calculates and stores the image characteristics 703. Next, the data is processed and compared to image characteristics of known signatures 704. Lastly, results of a possible match are provided 705.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An identification apparatus comprising:
   a scanner for capturing an image from a surface containing a signature;
   a memory coupled directly to said scanner for storing image characteristics of a known signature;
   a processor coupled to said memory which compares characteristics of a captured image with said image characteristics of said known signature to authenticate said captured image; and
   an output device coupled to said processor to indicate a probability of authentication of said captured image.

2. An apparatus according to claim 1, wherein the characteristics used to authenticate signatures comprise variations in sensitivities to illumination angles relative to the media surface comprising said signature.

3. An apparatus according to claim 1, wherein the characteristics used to authenticate signatures comprise variations in sensitivities to illumination of different wavelengths.

4. An apparatus according to claim 1, wherein the characteristics used to authenticate signatures comprise variations in line width of said signature.

5. An apparatus according to claim 1, wherein the characteristics used to authenticate signatures comprise variations in optical densities of said signature.

6. An apparatus according to claim 1, wherein the characteristics used to authenticate signatures comprise variations in shape of said signature.

7. An apparatus according to claim 1, wherein the characteristics used to authenticate signatures comprise variations in image contrasts of said signature.

8. An apparatus according to claim 1, wherein the characteristics used to authenticate signatures comprise variations in texture of the media that comprises said signature.

9. An apparatus according to claim 1, wherein the characteristics used to authenticate signatures are used to produce alternative representations of a signature.

10. An apparatus according to claim 1, wherein said optical imager comprises a light source for providing an applied illumination wherein said illumination is varied by incidence and collection angles relative to said signature.

11. An apparatus according to claim 1, wherein said optical imager comprises a light source for providing an applied illumination wherein said illumination is varied by the wavelength of said illumination.

12. An apparatus according to claim 1, wherein said characteristics are used to identify original works of art.

13. An apparatus according to claim 1, wherein said characteristics are used to identify the uniqueness of printed documents.

14. An apparatus according to claim 1, wherein said output device includes a tone generator that generates a tone to indicate said authentication.

15. An apparatus according to claim 1, wherein said output device includes a vibration generator which generates a vibration or pulse.

16. An apparatus according to claim 1, wherein said output device includes a visual display.

17. An apparatus according to claim 1, wherein said image characteristics are read directly from a peripheral device.

18. An apparatus according to claim 1, wherein said image characteristics are downloaded from a computer.

19. An apparatus according to claim 1, wherein said processor employs fuzzy logic.

20. An apparatus according to claim 1, wherein the results of said authentication are recorded.

21. An apparatus according to claim 1, wherein said characteristics of the captured image are recorded.

22. An apparatus according to claim 1, wherein the characteristics used to authenticate signatures comprise variations in sensitivities to illumination directions relative to the marks comprising said signature.

23. An apparatus according to claim 21, wherein said illumination is grazing.

24. An apparatus according to claim 1 further comprising a second memory coupled to said processor which stores records.

25. An apparatus according to claim 24 where a third memory is coupled to said processor and is used to store scanned images.

26. An apparatus according to claim 25, wherein said three memories comprise:
- a capture memory;
- a reference memory; and
- a record memory.

27. A method for authenticating a signature comprising:
- capturing an image from a surface containing a hand written signature with a scanner;
- storing image characteristics of a known signature to a memory coupled directly to the scanner;
- processing image characteristics of a captured image with said image characteristics of said known signature to authenticate said captured image; and
- outputting a probability of authentication of said captured image.

28. A method according to claim 27, wherein fuzzy logic is employed.

29. A method according to claim 27, wherein said characteristics are used to identify original works of art.

30. A method according to claim 27, wherein three memories are used to store scanned images.

31. A method according to claim 30, wherein said three memories comprise:
- a capture memory;
- a reference memory; and
- a record memory.

* * * * *